US 8,121,875 B2
Feb. 21, 2012

(12) United States Patent
Mantena et al.

(10) Patent No.: US 8,121,875 B2
(45) Date of Patent: Feb. 21, 2012

(54) COMPARING TAXONOMIES

(75) Inventors: Chakrapani Mantena, Springfield, NJ (US); Clicia Guzzardo, New York, NY (US); Emira Dzananovic, Astoria, NY (US); Rodrigo Toller, Woodbridge, NJ (US); Stephen David Larson, La Jolla, CA (US)

(73) Assignee: Morgan Stanley, New York, NY (US)

( * ) Notice: Subject to any disclaimer, the term of this patent is extended or adjusted under 35 U.S.C. 154(b) by 1423 days.

(21) Appl. No.: 11/537,220

(22) Filed: Sep. 29, 2006

(65) Prior Publication Data

US 2008/0082529 A1    Apr. 3, 2008

(51) Int. Cl.
*G06F 17/60* (2006.01)
(52) U.S. Cl. ...................................... 705/7.11
(58) Field of Classification Search ............. 705/7.11
See application file for complete search history.

(56) References Cited

U.S. PATENT DOCUMENTS

| 6,868,525 | B1 * | 3/2005 | Szabo | 715/738 |
| 2003/0041077 | A1 * | 2/2003 | Davis et al. | 707/500 |
| 2003/0083892 | A1 | 5/2003 | Ramachandran et al. | |
| 2003/0172013 | A1 * | 9/2003 | Block et al. | 705/33 |
| 2004/0249676 | A1 | 12/2004 | Marshall et al. | |
| 2004/0267779 | A1 * | 12/2004 | Carter et al. | 707/100 |
| 2005/0021528 | A1 | 1/2005 | Andreev | |
| 2006/0106814 | A1 * | 5/2006 | Blumenau et al. | 707/10 |
| 2006/0106847 | A1 * | 5/2006 | Eckardt et al. | 707/101 |
| 2007/0282918 | A1 * | 12/2007 | Holloway et al. | 707/200 |

OTHER PUBLICATIONS

Peneder (Intangible Investment and human resources), Dec. 2002, Journal of Evolutionary Economics, pp. 107-134.*
ISR and Written Opinion, PCT/US2007/79912, Sep. 28, 2007.

* cited by examiner

*Primary Examiner* — Romain Jeanty
(74) *Attorney, Agent, or Firm* — K&L Gates LLP

(57) ABSTRACT

A system for comparing a first taxonomy and a second taxonomy. The system may comprise at least one processor having associated cache memory, a cache module and a comparison module. The cache module may be configured to load a portion of a comparison sample to the cache memory. The comparison sample may comprise a part of the first taxonomy and a part of the second taxonomy. The comparison module may be configured to cause the processor to retrieve the portion of the first comparison sample from the cache memory and compare the portion of the first comparison sample.

15 Claims, 14 Drawing Sheets

COMPARING TAXONOMIES

BACKGROUND

Many financial analysts and other financial professionals create and maintain financial models to describe the financial condition of corporations or other business entities across the economy. The models include collections of equations that operate on raw or intermediate financial data (e.g., gross sales, overhead expenses, etc.) to generate values describing the business entities (e.g., earnings, net profit, etc.). Financial analysts create various reports based on the results of the models such as, for example, forecasts, other analysis, etc., The reports are distributed to clients and/or the public at large, who often consider them to determine investment strategies.

The financial models discussed above are often computer-implemented. For example, a financial model, or set thereof, may be implemented by a taxonomy expressed in any suitable computer language or format such as, for example, Extensible Markup Language (XML), Extensible Business Reporting Language (XBRL). The taxonomy may define the inputs, outputs and/or intermediate values of the model and the relationships therebetween. For example, a taxonomy may provide guidelines that allow a computer to receive a set of input values, identify the input values based on the quantities that they represent, and calculate values describing business entities based on the input values. In this way, financial analysts may quickly and efficiently apply a financial model to different sets of input data.

Taxonomies implementing financial models are changed from time-to-time for various reasons (e.g., regulatory changes, accounting practice changes, error correction, etc.). Due to the complexity of most financial models and taxonomies, it is often unclear how a small change to correct an error or comply with a government regulation will affect the taxonomy, or the results of the financial model. If results of the financial model change, and those results were the basis of a financial analyst's report, then the financial analyst is required by various government regulations to issue an update to the report that reflects the new results. Accordingly, it is necessary to analyze changes in a taxonomy to determine how the changes affect the output (e.g., by comparing the original taxonomy to the modified taxonomy).

Existing methods for comparing taxonomies are slow, inefficient and unreliable. The existing methods involve downloading taxonomies from separate databases or other components to a single computer over a network. The single computer then compares the taxonomies item-by-item. This method takes a considerable amount of time, as downloading the two taxonomies involves transmitting a large amount of data and can create and/or contribute to network bottlenecks. During transmission delays, no comparison can take place, and therefore, the process is extended. Also, due to the potential transmission delays and the complexity of the operation, the single computer is often prone to crashing. When the single computer crashes, the comparison is lost and must be restarted.

SUMMARY

One general aspect of the present disclosure is directed to methods of comparing a first taxonomy and a second taxonomy. The methods may comprise the steps of receiving a definition of a comparison sample, and loading a first portion of the comparison sample to cache memory of at least one processor. The comparison sample may comprise a part of the first taxonomy and a part of the second taxonomy. The methods may also comprise the step of comparing the first portion of the comparison sample using the at least one processor. System embodiments are also disclosed.

According to another general aspect, methods of comparing a first taxonomy and a second taxonomy are disclosed, where the methods comprise the step of displaying a user interface. The user interface may comprise a plurality of listings corresponding to one of a plurality of metrics included in at least one of the first taxonomy and the second taxonomy. The user interface may also comprise a plurality of indications. Each of the indications may correspond to one of the plurality of metrics. Also, each indication may indicate a comparison between a definition of the corresponding metric in the first taxonomy and a definition of the corresponding metric in the second taxonomy.

In another aspect, the user interface may comprise an indication of a metric that describes a plurality of companies, an indication of a plurality of industries, and a plurality of indications. Each of the plurality of indications may correspond to one of the plurality of industries, and may indicate a change in the metric between the first and the second taxonomies over examples of the plurality of companies classified in the corresponding industry.

In yet another aspect, the user interface may comprise a first nested definition of a first metric in the first taxonomy and a second nested definition of the first metric in the second taxonomy. The first nested definition may be expandable to list a component metric of the first metric and a sub-component metric of the component metric. The second nested definition may also be expandable corresponding to the first nested definition, and may list the component metric of the first metric and the sub-component metric of the component metric.

Yet another general aspect of the present disclosure is directed to methods of analyzing a taxonomy. The methods may comprise the step of displaying a user interface. The user interface may comprise a field configured to receive the name of a first metric included in the taxonomy. The user interface may also comprise a field configured to display other metrics in the taxonomy that are part of the definition of the first metric, and a field configured to display other metrics in the taxonomy whose definition depends on the first metric.

BRIEF DESCRIPTION OF THE FIGURES

Embodiments of the present invention are described herein, by way of example, in conjunction with the following figures, wherein:

FIGS. 6A, 6B and 7-13 show user interfaces according to various embodiments.

DETAILED DESCRIPTION OF THE INVENTION

Various embodiments of the present disclosure are directed to methods and systems for comparing two taxonomies. As used herein, the term "taxonomy" refers to a set of definitional relationships between quantities. Also, as used herein, the term "metric" refers to a quantity that is defined by a taxonomy. It will be appreciated that metrics may be financial metrics that relate to financial values, or any other kind metric relating to any other kind of data value.

Figure 1:
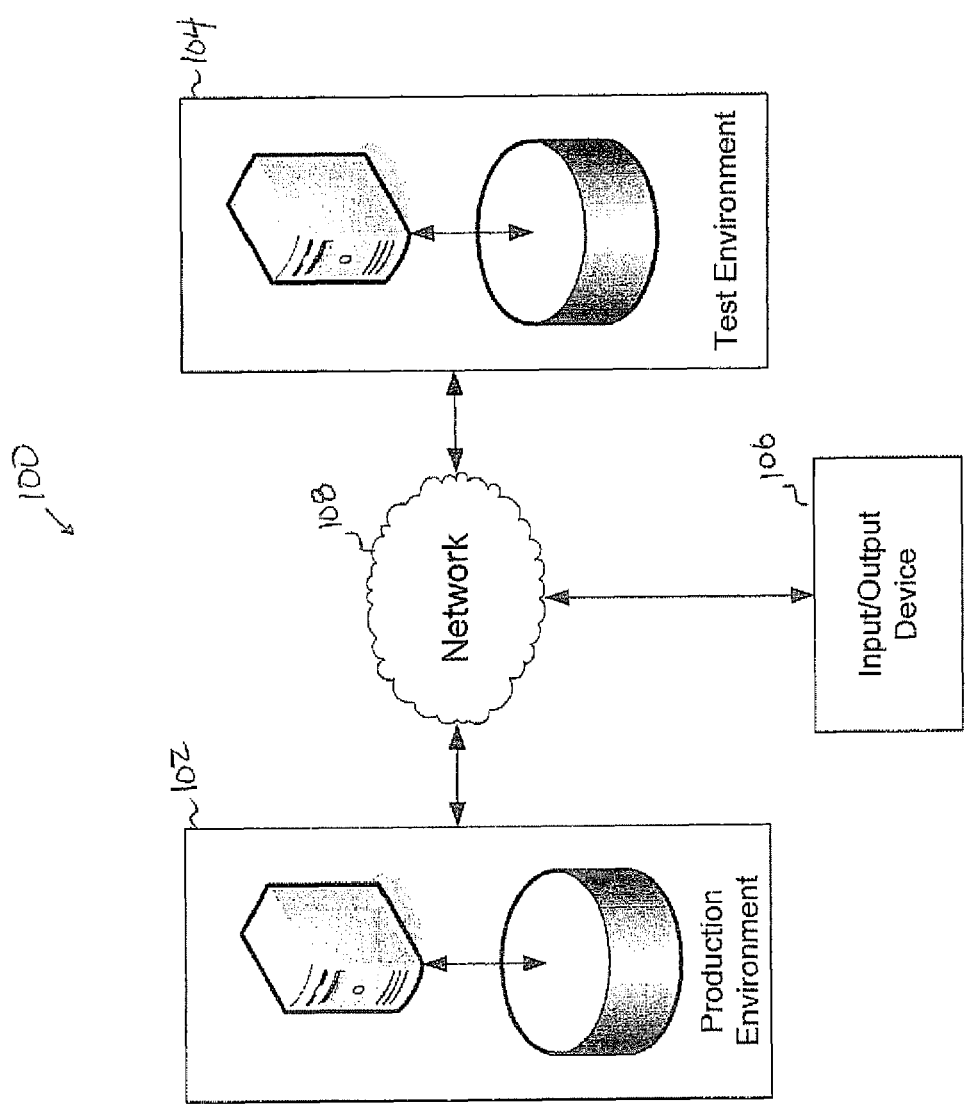
FIG. 1 shows a block diagram of a computer system according to various embodiments.

FIG. 1 shows a computer system 100, according to various embodiments, for comparing taxonomies. The computer system 100 may include a production environment 102, a test environment 104, and an input/output device 106 connected by a network 108, which may be any suitable wired or wireless network. The production environment 102 may include various servers, databases, user devices, etc. (not shown) and may host a taxonomy during normal use. For example, when the taxonomy implements a financial model, the production environment 102 may apply the taxonomy to input data to generate metric values describing companies or other economic units and report its results, for example, to an input/output device 112. The input/output device 112 may be any kind of device that allows a user of the computer system 100 to provide input and receive output from the production environment 102 and/or the test environments 104, 106.

Figure 4:
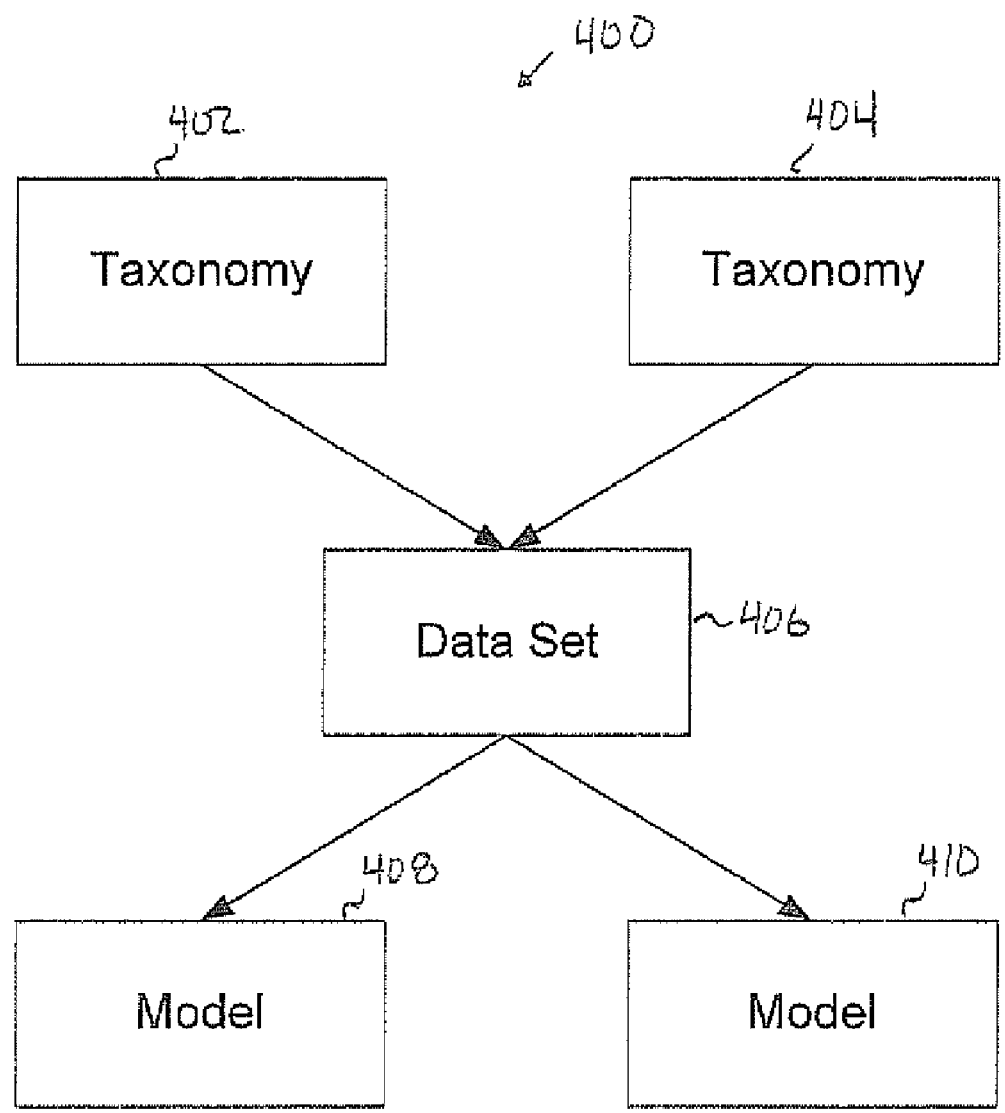
FIG. 4 shows a block diagram of taxonomies and data sets according to various embodiments.

The test environment 104 may also include various servers, databases, user devices, etc. (not shown), and may perform a comparison between at least two taxonomies. It will be appreciated that performing a comparison between two taxonomies may involve comparing the definitions included in the taxonomies as well as comparing the application of the taxonomies to a data set. For example, FIG. 4 shows a diagram 400 of a first taxonomy 402 and a second taxonomy 404 that may be compared. To facilitate comparison, the taxonomies may be applied to a common data set 406 (e.g., the metric definitions included in the taxonomies may be applied to various input metric values present in the common data set 406). The result may be a first model data set 408 resulting from the application of the first taxonomy 402 to the data set 406, and a second model data set 410 resulting from the application of the second taxonomy 404 to the data set 406. In various embodiments, the test environment 104 may apply the first and second taxonomies 402, 404 to the common data set 406 to generate the model data sets 408, 410.

Figure 2:
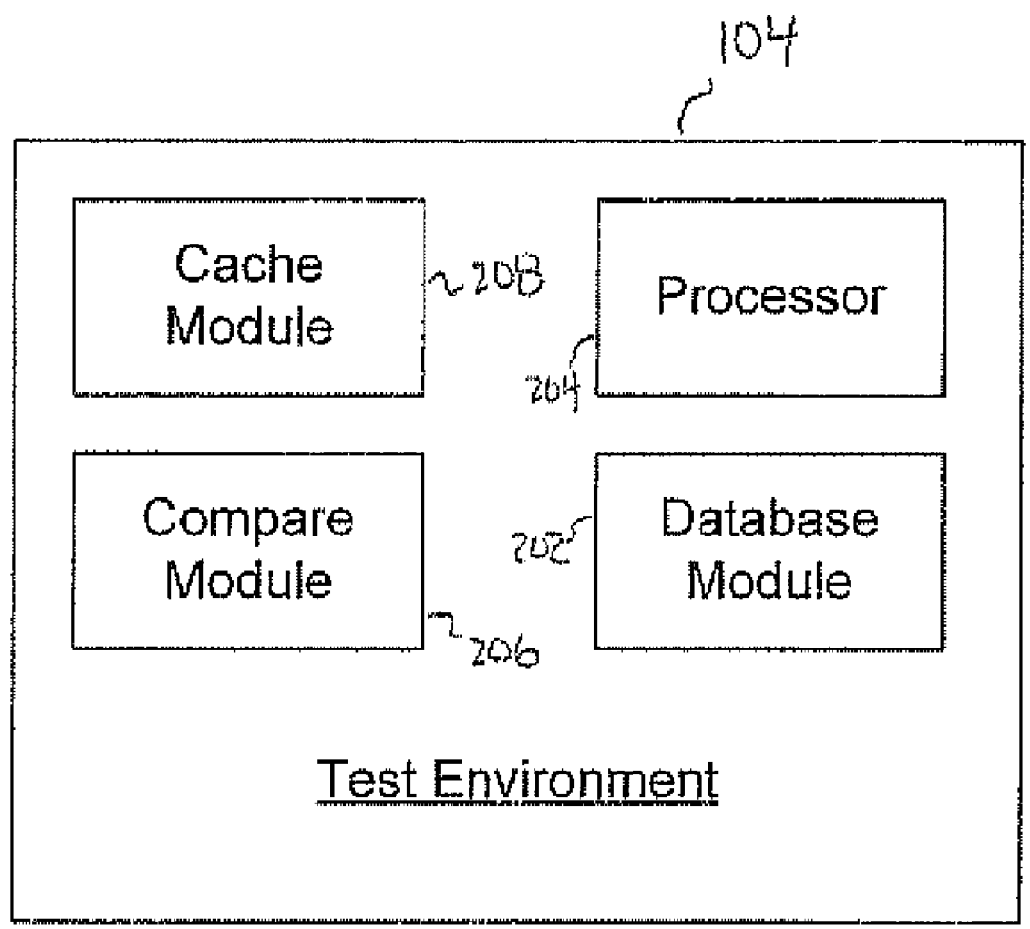
FIG. 2 shows a block diagram of a test environment according to various embodiments.

FIG. 2 shows an example configuration of the test environment 104 including a database module 202, a processor 204, a compare module 206 and a cache module 208. It will be appreciated that the components 202, 204, 206, 208 of the test environment 200 may be implemented as any suitable hardware or software unit. For example, the processor 204 may be a part of a server or other hardware device (not shown). Also, compare module 206 and cache module 208 may be implemented as software instructions to be executed by the processor 204 or another processor (not shown).

Figure 3:
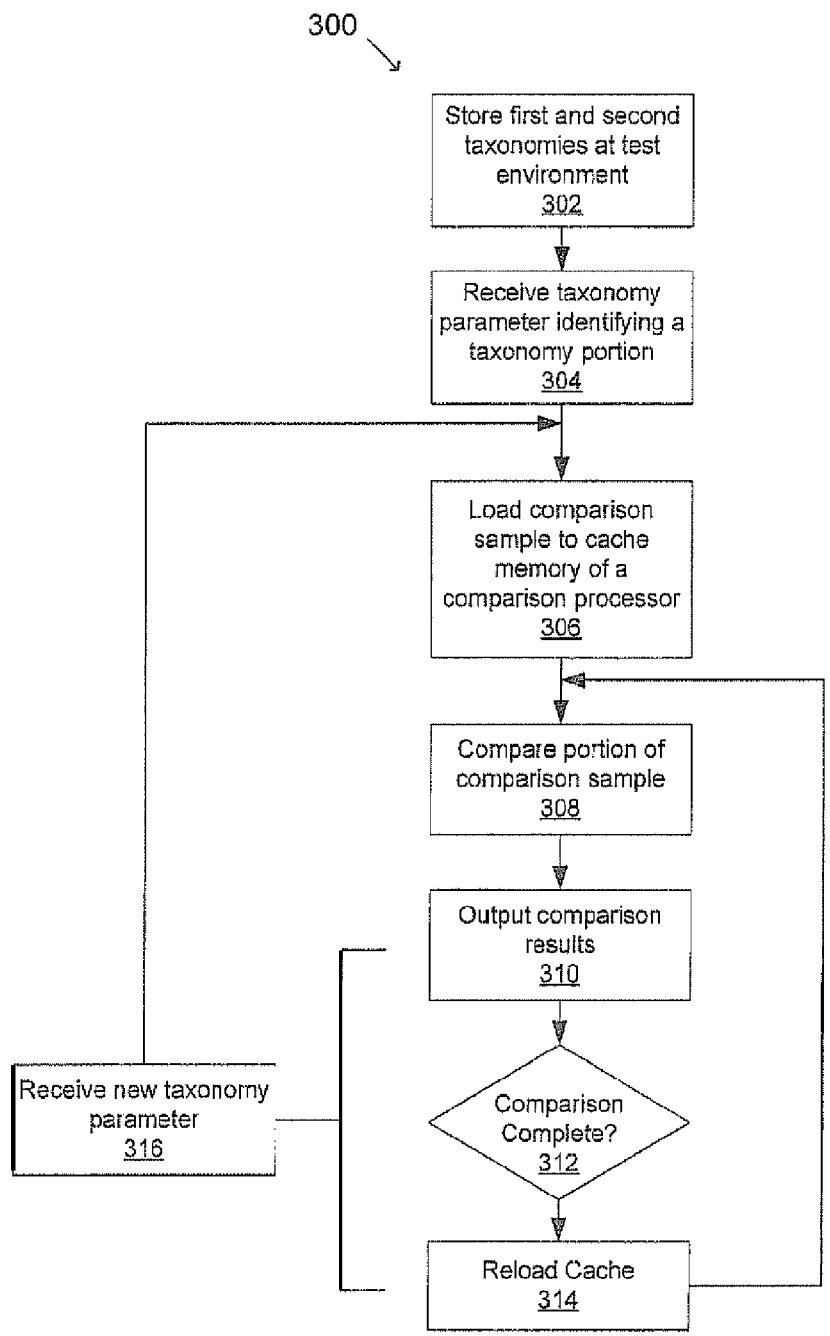
FIG. 3 shows a process flow illustrating a process for comparing a first taxonomy and a second taxonomy according to various embodiments.

FIG. 3 shows a process flow 300, according to various embodiments, for comparing the first and second taxonomies 402, 404. At step 302, first and second taxonomies 402, 404 may be stored at the test environment 104, for example, at a database module 202. Storing the first and second taxonomies 402, 404 to the test environment 104 may involve storing the taxonomies themselves or storing the taxonomies along with one or more of a common data set 406, and model data sets 408, 410.

At step 304, the test environment 104 may receive a taxonomy parameter that identifies a comparison sample, or a portion of the taxonomies 402, 404 and/or model data sets 408, 410 to be compared. For example, when the taxonomies 402, 404 represent a financial model, the comparison sample may include various companies, industries, sub-industries, etc., described by one or more of the taxonomies 402, 404. The comparison sample may also be organized to include various metrics or sub-metrics included in one or more of the taxonomies 402, 404. It will be appreciated that when a complete comparison of the taxonomies 402, 404 is desired, the comparison sample may include all of the taxonomies 402, 404 and/or model data sets 408, 410.

In various embodiments, the cache module 208 of the test environment 104 may load the all or a portion of the comparison sample into cache memory at step 306. Cache memory may be data storage with an access time that is relatively less than that of other data storage available in the test environment 104. In various embodiments, cache memory may be associated with the processor 204. Because the time necessary for the processor 204 to access cache memory is less than that necessary for other forms of data storage, loading the taxonomy portions to cache memory may facilitate fast comparison by reducing the number of processor cycles that are wasted waiting for input data.

At step 308, a portion of the comparison sample may be compared. The comparison may be performed by the processor 204, for example, by executing instructions included in the comparison module 206. In various embodiments, the comparison may be asynchronous, as shown in process flow 300. For example, after the portion of the comparison sample is compared at step 308, the results of comparing that portion may be output to the input/output device 106 either before, or while the next portion of the comparison sample is compared. In this way, partial results of the desired comparison may be provided to a user before the entire comparison is complete. In various embodiments, the order of the comparison may be manipulated so that the first values output at step 310 are those that may be of most interest to a user. If, at decision step 312, the comparison is not complete, the process flow 300 may continue.

It will be appreciated that, in embodiments where the comparison sample is loaded to cache memory, the comparison sample may be too large to fit in available cache memory at step 306. In that case, after a portion of the comparison sample has been compared, the cache module 208 may remove that portion from cache memory and replace it with an uncompared portion of the comparison sample at step 314. In this way, the contents of the cache memory may be cycled, allowing the processor 204 and/or compare module 206 to retrieve data from cache memory rather than another storage medium with longer access time. In various embodiments, the cache module 208 may be executed by a second processor (not shown in FIG. 2). In this way, the cache module 208 may cycle the cache memory while the compare module 206 and processor 204 are performing comparisons.

In various embodiments, the process flow 300 may be interruptible. For example, a second taxonomy parameter may be received at step 316. The second taxonomy parameter may identify a second comparison sample. The second taxonomy parameter may be received at any time during the comparison of the previous comparison sample. When the second taxonomy parameter is received, comparison of the first comparison sample may cease. A portion of the new comparison sample may be loaded to cache memory at step 306, and the process flow 300 may continue as described to compare the new comparison sample. In various embodiments, the test environment 104 may continue comparison of the first comparison sample after the second comparison sample is processed.

Figure 5:
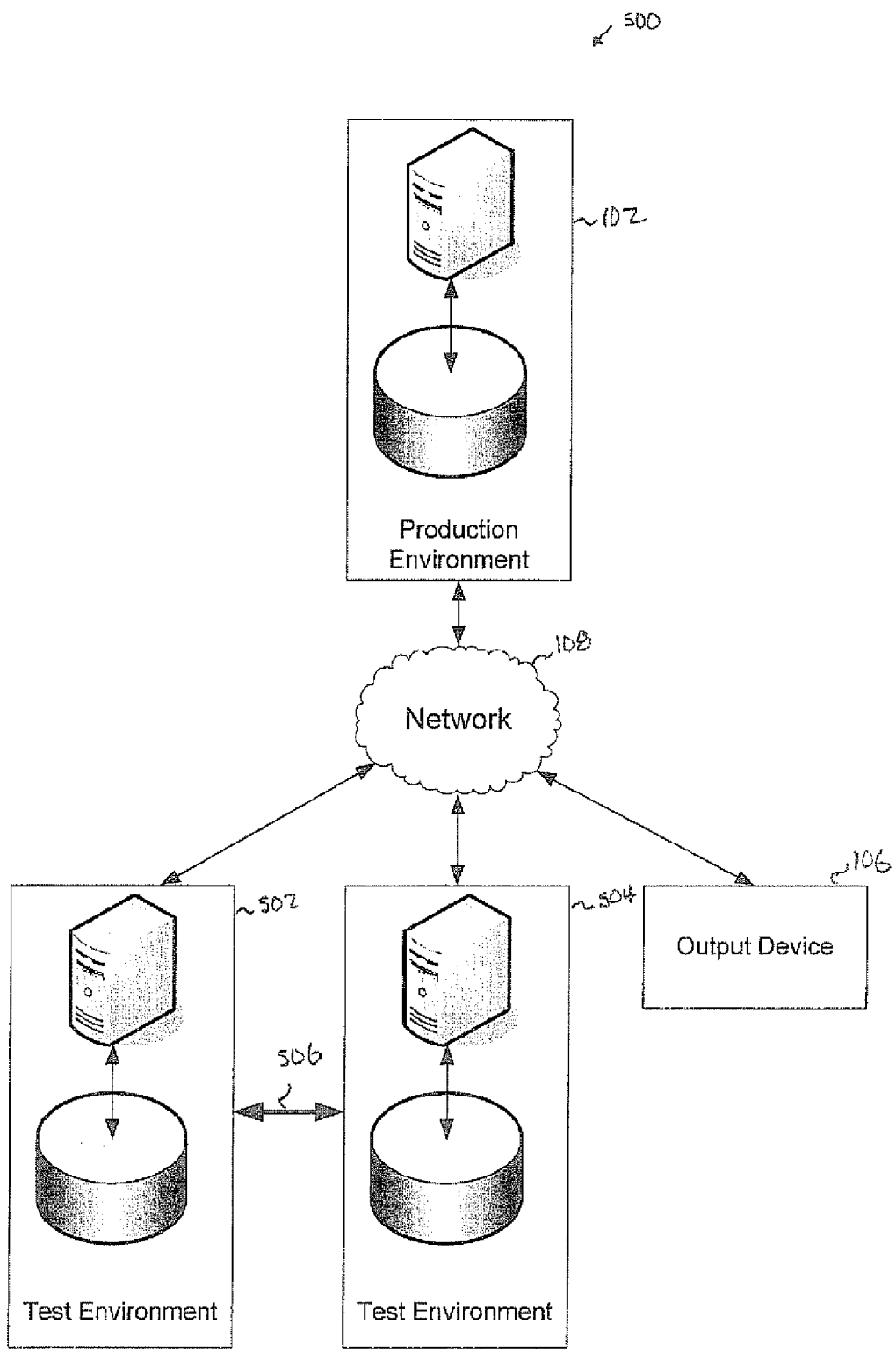
FIG. 5 shows a block diagram of a computer system according to various embodiments.

FIG. 5 shows another computer system 500 that maybe used, according to various embodiments, to implement the process flow 300. The computer system 500 includes two test environments 502 and 504. In various embodiments, the first taxonomy 402 may be loaded to the first test environment 502, while the second taxonomy 404 may be loaded to the second test environment 504. The comparison of the two taxonomies 402, 404 may be performed by a component of either the first test environment 502 or the second test environment 504.

In various embodiments, the comparison speed of the computer system 500 may be enhanced by providing a high-speed communications link 506 to facilitate the fast transfer of information (e.g., data related to the comparison of taxonomies) between the test environments 502, 504 during comparison. The link 506 may support communication at a higher rate than that supported generally by the network 108. For example, in various embodiments, the communication link 506 may support communications at 1 Gigabit, while the network 108 may generally support communications at a lower rate such as, for example, 10 Megabits. The link 506 may be a part of the network 108, or may be a stand-alone connection. For example, in various embodiments, link 506 may be a dedicated link that is not subject to network bottlenecks caused by network traffic not related to the comparison of taxonomies.

As described above, a user may provide input and receive results from the computer systems 100, 500 and process flow 300 through an input/output device 106, which may be any suitable computer device. It will be appreciated that although the input/output device 106 is shown as a separate component, it may be a part of production environment 102 and/or test environments 104, 502, 504. In various embodiments, the input/output device 106 may serve various user interfaces to a user to facilitate input and output. FIGS. 6A, 6B and 7-13 show user interfaces, according to various embodiments, for receiving input from a user, providing comparison results, and providing additional taxonomy analysis functionality. The FIGS. 6A, 6B and 7-13 show user interfaces tailored to taxonomies representing financial models, however it will be appreciated that other user interfaces tailored to other taxonomy applications could be used.

Figure 6A:
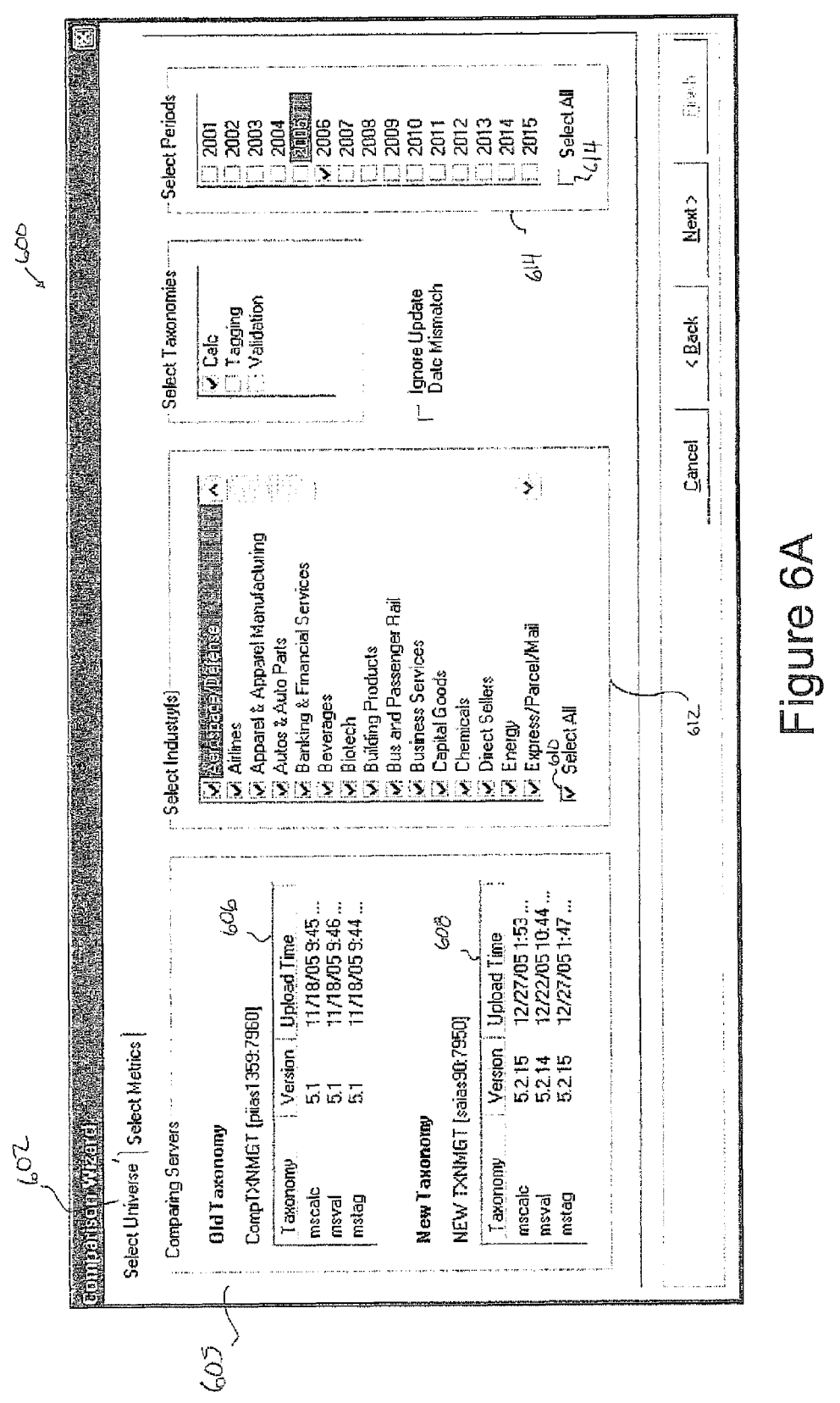
Figure 6B:
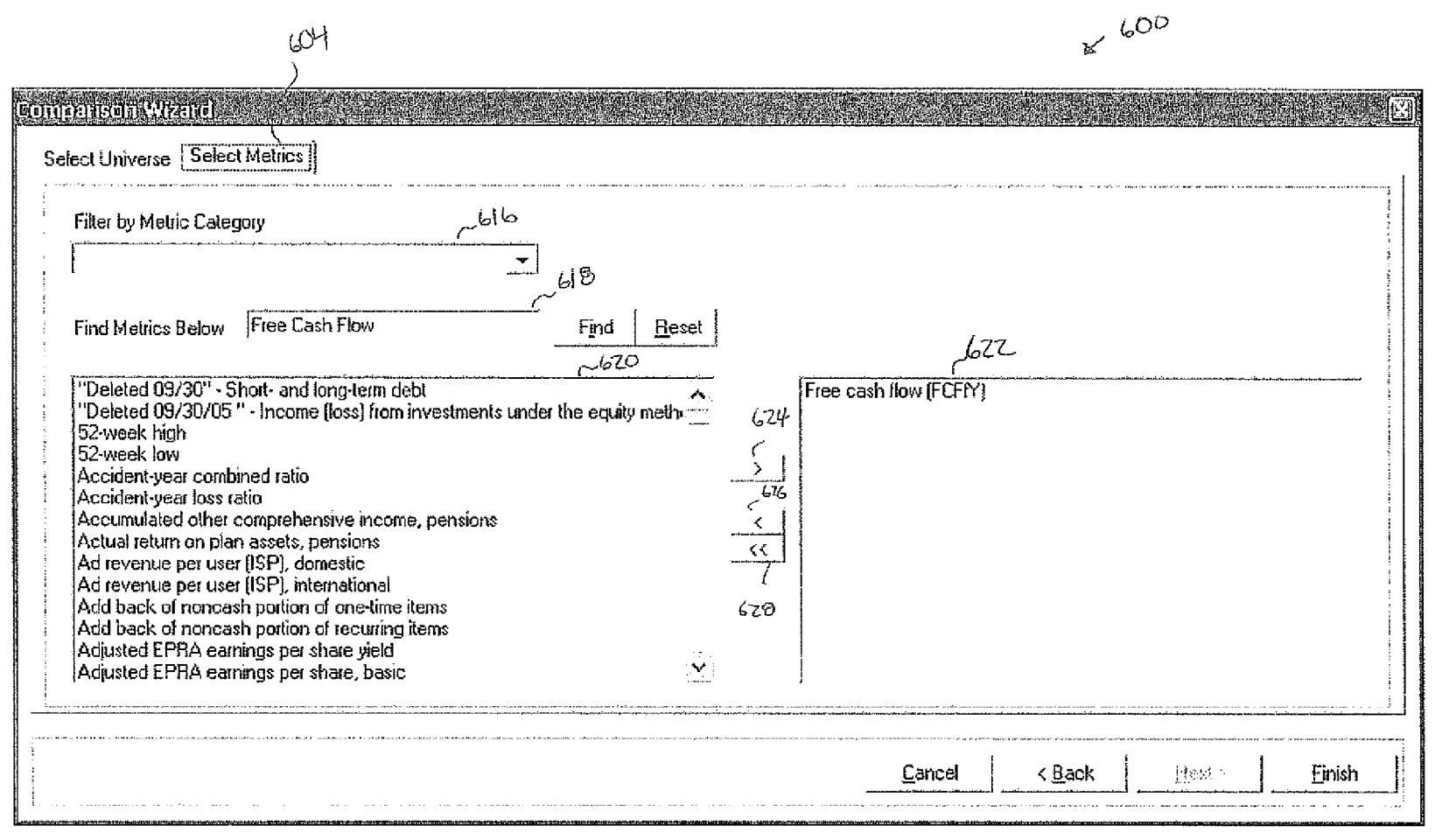

FIGS. 6A and 6B show a user interface 600, according to various embodiments, for receiving input information (e.g., a taxonomy parameter identifying a comparison sample as described above). FIG. 6A shows the interface 600 with a Select universe tab 602 activated. Box 605 may allow a user to identify taxonomies to be compared. A first taxonomy may be identified at field 606 and a second taxonomy may be identified at field 608. At box 612, a given industry or industries may be selected for inclusion in the comparison sample. For example, the user may place a check mark next to the industries to be included. Placing a check mark in box 610 may cause all industries to be included in the comparison sample. Similarly, time periods may be selected for inclusion in the comparison sample at box 614. In various embodiments, only metric values of the taxonomies corresponding to the selected year or years may be considered for the comparison. All available years may be selected by placing a check mark in box 614.

Referring now to FIG. 6B, the user interface 604 may receive information that allows the user to choose metrics to be included and/or excluded from the comparison sample. For example, a list of all available metrics may be shown in box 620. A list of selected metrics (e.g., metrics that will be included in the comparison sample) is shown at box 622. The user may add a metric to box 622 by selecting the metric and then activating button 624. If a metric is mistakenly placed with the selected metrics at box 622, the user may remove it by selecting the desired metric and activating button 676. All metrics may be removed from box 622 by selecting button 628. The user interface 604 may also include features that allow a user to search or filter the available metrics listed in box 620. For example, a category of metrics may be selected from drop-down menu 616 to limit the metrics shown in box 620 to those in the selected category. Also, a text search of available metrics may be conducted using box 618. Results of the search may be shown in field 620.

Figure 7:
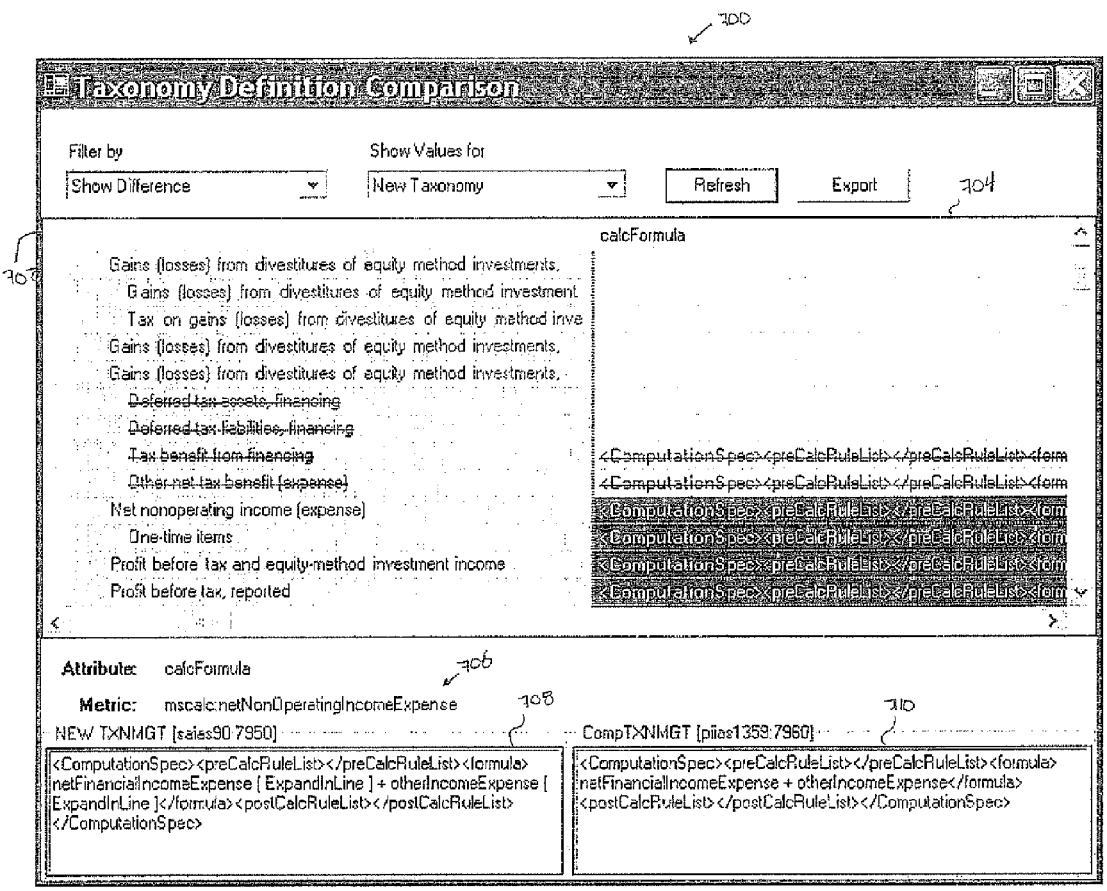

FIG. 7 shows a user interface 700, according to various embodiments, for displaying definition differences between two compared taxonomies. At box 702, the user interface 700 may display a list of all metrics included in the comparison sample. The box 702 may also include an indication of the metrics that are included in one taxonomy, but not the other. For example, as shown in FIG. 7, metrics that have been added to the second taxonomy relative to the first taxonomy may be shown in green, while metrics that have been deleted from the second taxonomy relative to the first taxonomy may be struck through and marked in red. Box 704 displays the definition of the corresponding metrics from box 702. In various embodiments, the box 704 may show only those metrics whose definition has changed. For example, as shown in FIG. 7, metrics that have been deleted from the first taxonomy relative to the second may be shown crossed out and in red. Also, metrics present in both taxonomies, but whose definition has changed may be indicated, for example, by the highlighting shown in FIG. 7, which may be red or any other suitable color. In various embodiments, a user may select a particular metric from field 702 and 704, causing the definitions of the metric in the first and second taxonomies to appear at fields 708 and 710 respectively. In this way, the user may analyze changes in metric definitions between the first and second taxonomies. The name of the selected metric may appear at field 706.

Figure 8:
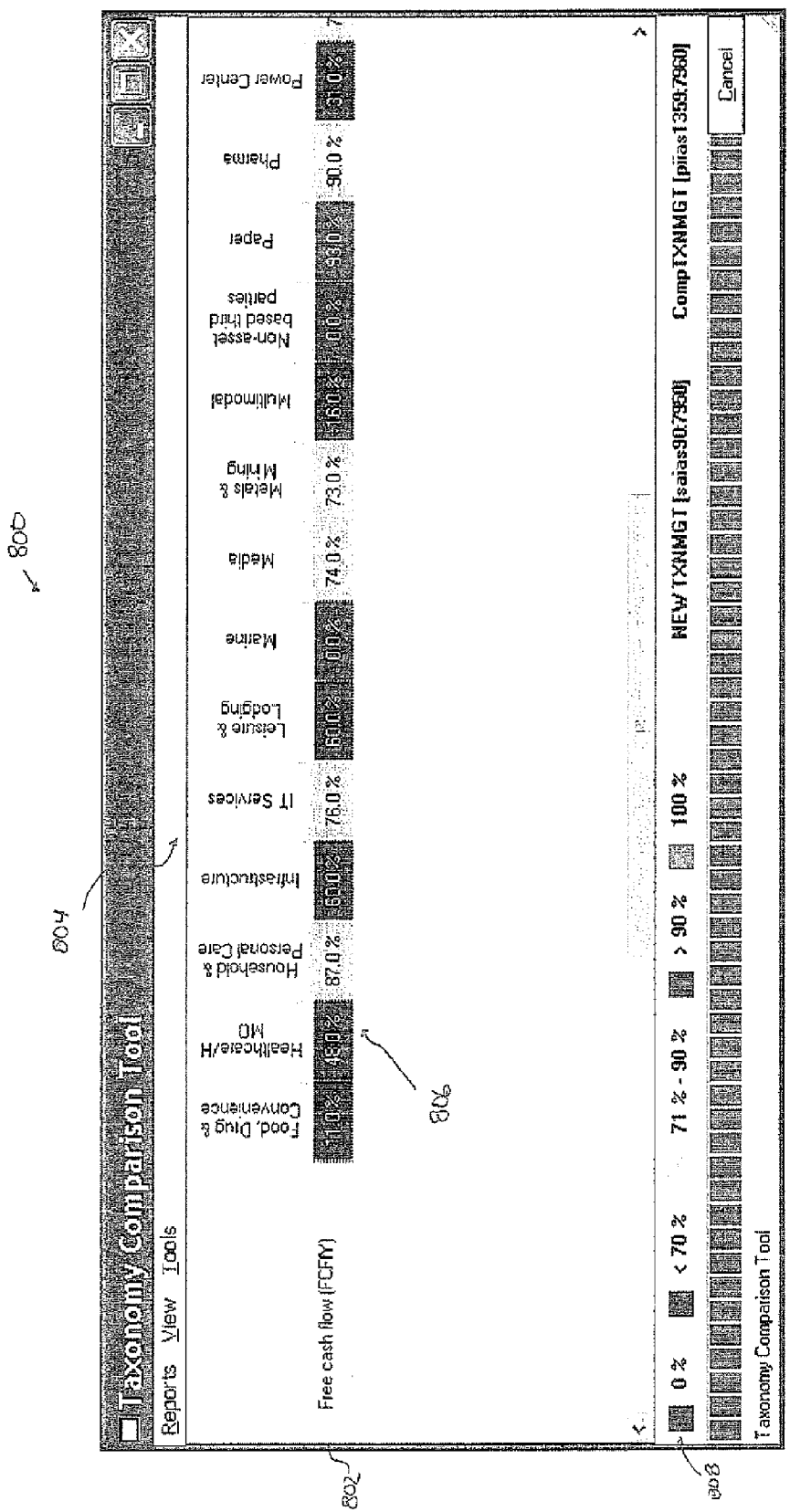

FIG. 8 shows another user interface 800, according to various embodiments, for displaying the results of a comparison of taxonomies at an industry level. Row 802 lists a metric, while columns 804 each list an industry. Although only one metric row 802 is shown, it will be appreciated that additional metrics and additional rows (not shown) may be added. A data block 806 may be present for each metric/industry combination. The data blocks 806 may indicate changes between the first and second taxonomies on an industry-by-industry basis. For example, each data block 806 may represent the amount of difference (e.g., percentage difference) between the first and second taxonomies for the associated metric and industry. The percentage difference may be indicated by a color and a number. For example, a color legend 808 may indicate which colors correspond to particular ranges of percentage change. In various embodiments, the percentage difference may represent the percentage of metric definitions that changed, the percentage of metric values that changed, etc.

Figure 9:
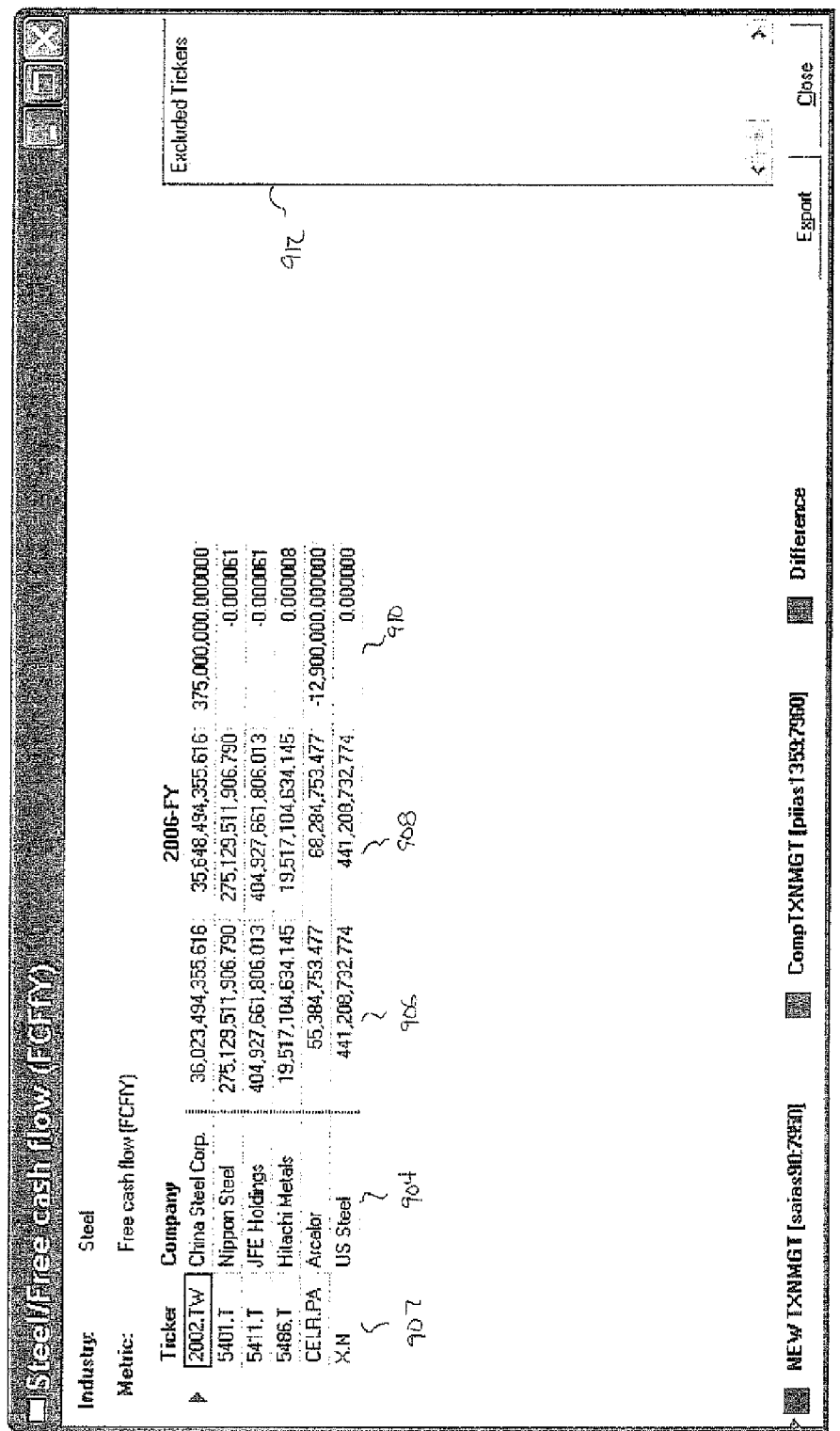

FIG. 9 shows a user interface 900, according to various embodiments, for displaying the results of a comparison between two taxonomies for a particular metric across multiple companies in an industry. The user interface 900 may show a difference in values for a metric between the model data sets 408, 410. For example, as shown in FIG. 9, the user interface 900 is configured to show the difference between the first and second taxonomies for the metric "free cash flow" for companies in the "steel" industry over fiscal year 2006. The ticker symbol of the company may be shown at 902 and company name at field 904. Field 906 may show the value of the selected metric under the first taxonomy, and field 908 may show the value of the selected metric under the second taxonomy. The difference between the values in column 906 and 908 may be shown in column 910. It will be appreciated that the values in columns 906, 908 and 910 may be color-coded to indicate their origin. For example, as shown in FIG.

9, values from the first taxonomy may be in blue, values from the second taxonomy may be in green and the differences may be in maroon, as indicated by legend 914. It will be appreciated that when one or more companies in a particular industry are excluded from display in user interface 900, they may be listed at field 912.

Figure 10:
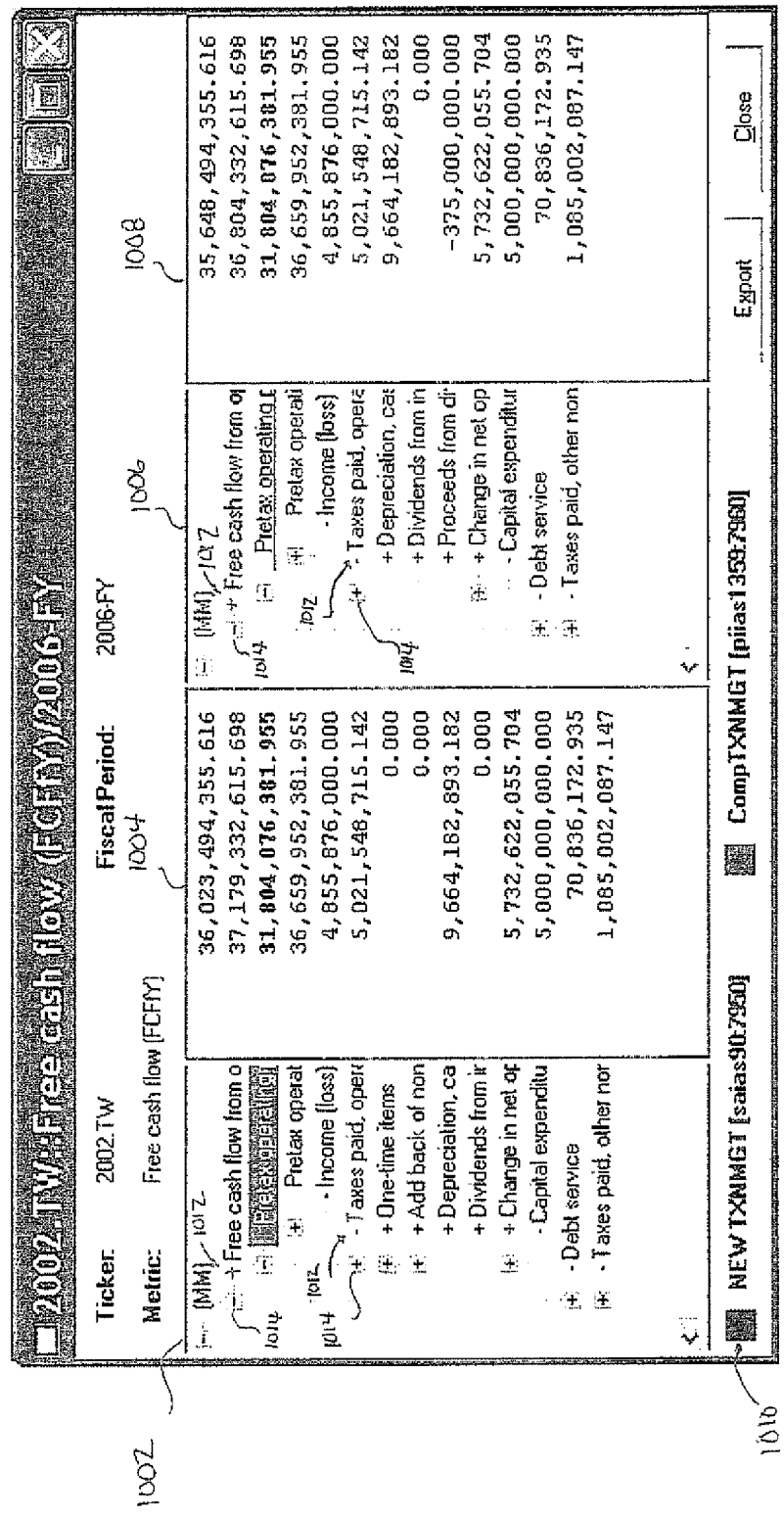

FIG. 10 shows a user interface 1000 according to various embodiments, for displaying comparison results broken down by metric definition and component values. For example, as shown in FIG. 10, the interface 1000 shows the difference between the first and second taxonomies for the metric "free cash flow (FCFRfY). Box 1002 shows a nested definition of the metric under the first taxonomy. The nested definition may include various components and sub-components of the metric. Each displayed component and sub-component is preceded by a value sign 1012 (e.g. a plus sign or a minus sign). The value sign 1012 indicates whether the component is added or subtracted from the other components to derive the metric. Each of the components having sub-components nested thereunder may be expanded to show the sub-components, or condensed to hide the sub components, using plus and minus buttons 1014. It will be appreciated that expanding a component or sub-component using button 1014 may cause the interface 1000 to display additional information, requiring additional comparison and/or other processing to generate the value. In various embodiments, this may be accomplished by interrupting the comparison module 206 and providing an additional comparison sample including the portions of the taxonomies corresponding to the additional information. When the comparison module 206 finishes generating the additional information, it may continue comparison of the original comparison sample as described above.

Referring again to the interface 1000, the values for each component or sub-component under the first taxonomy are shown in field 1004. A nested definition of the metric under the second taxonomy is shown at field 1006, with the values of the components and sub-components of field 1006 shown at field 1008. In this way, a user may view definitional and value differences between two taxonomies side-by-side. It will be appreciated that text color may indicate whether a nested definition or value originates from the first taxonomy or the second taxonomy. For example blue may indicate data from the first taxonomy and green may indicate data from the second taxonomy.

Figure 11:
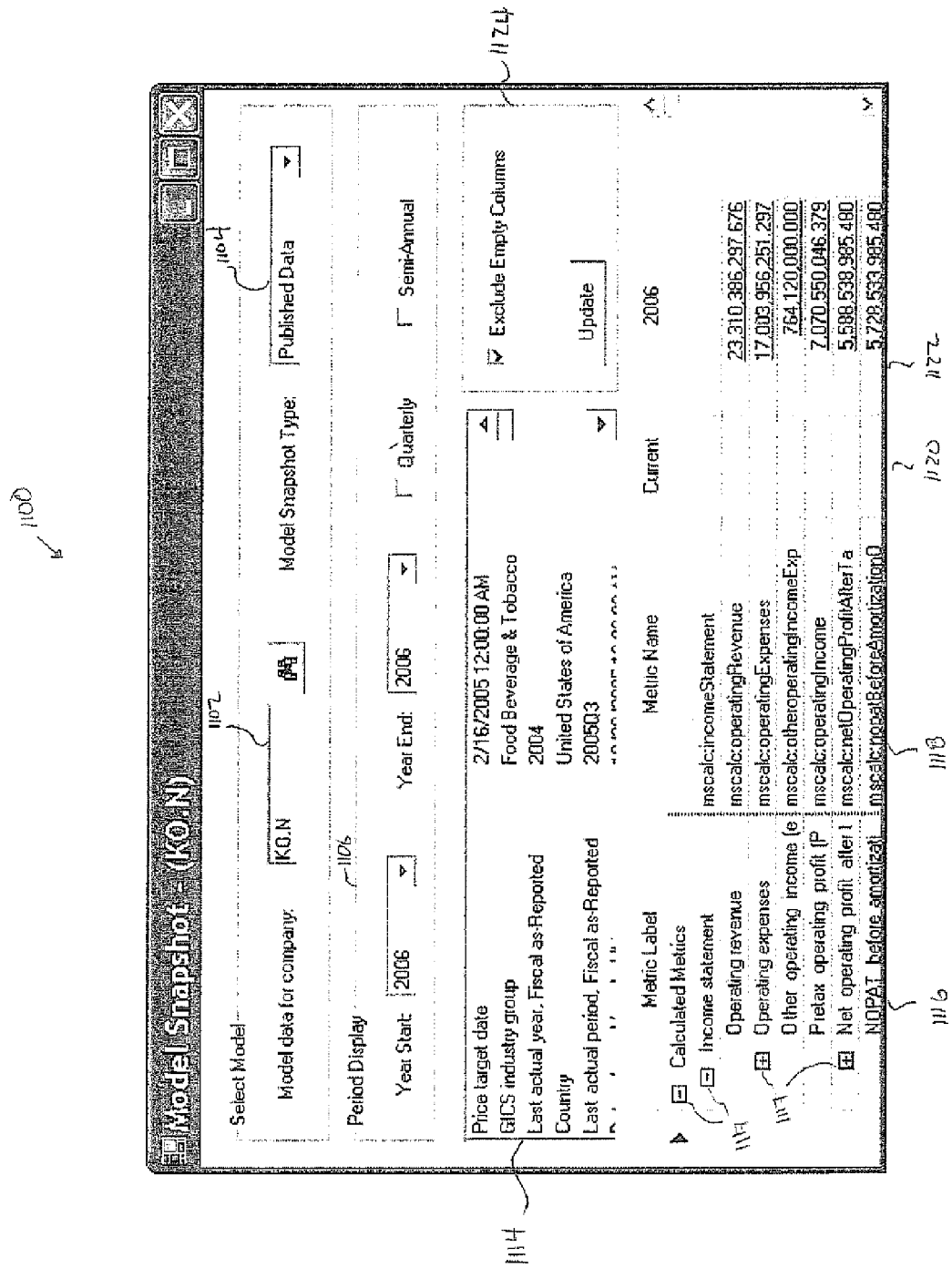
Figure 12:
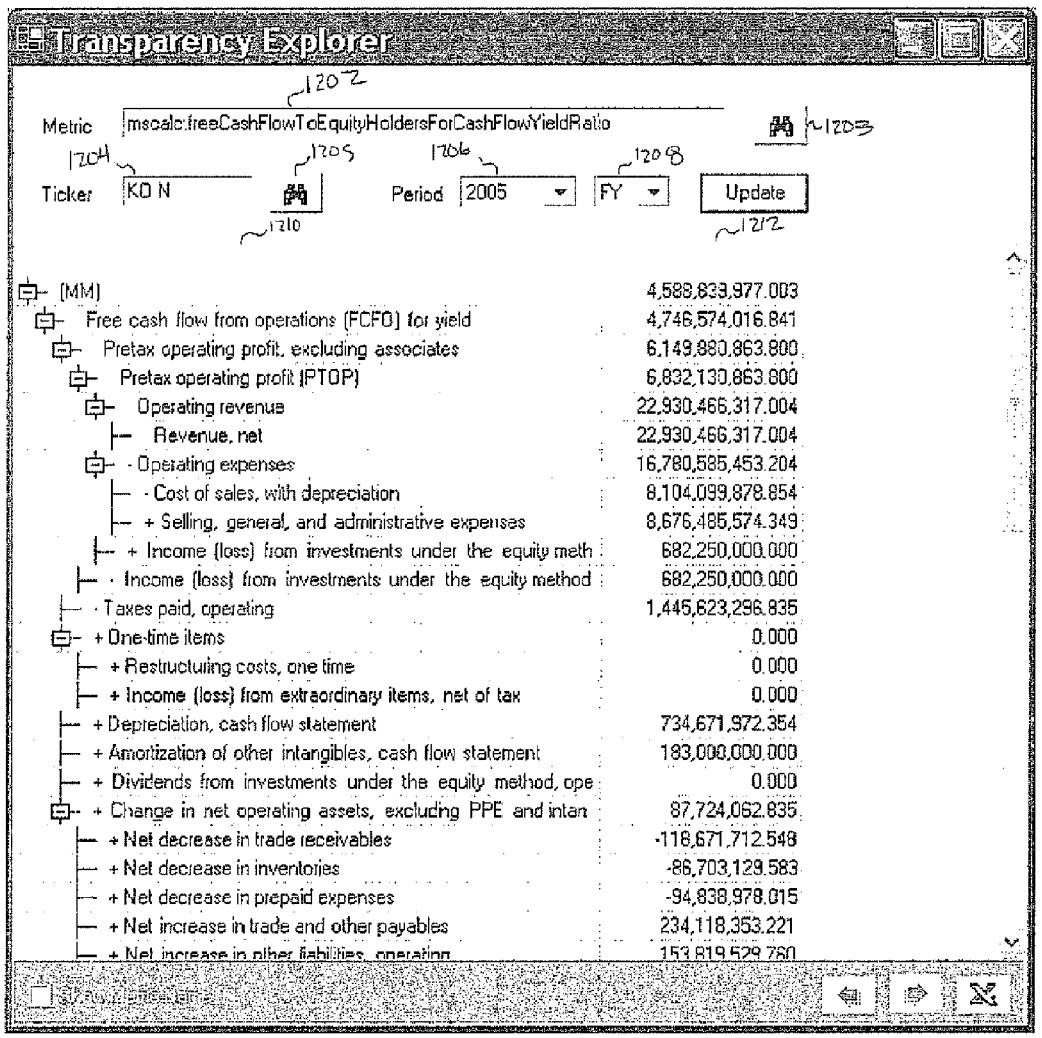
Figure 13:
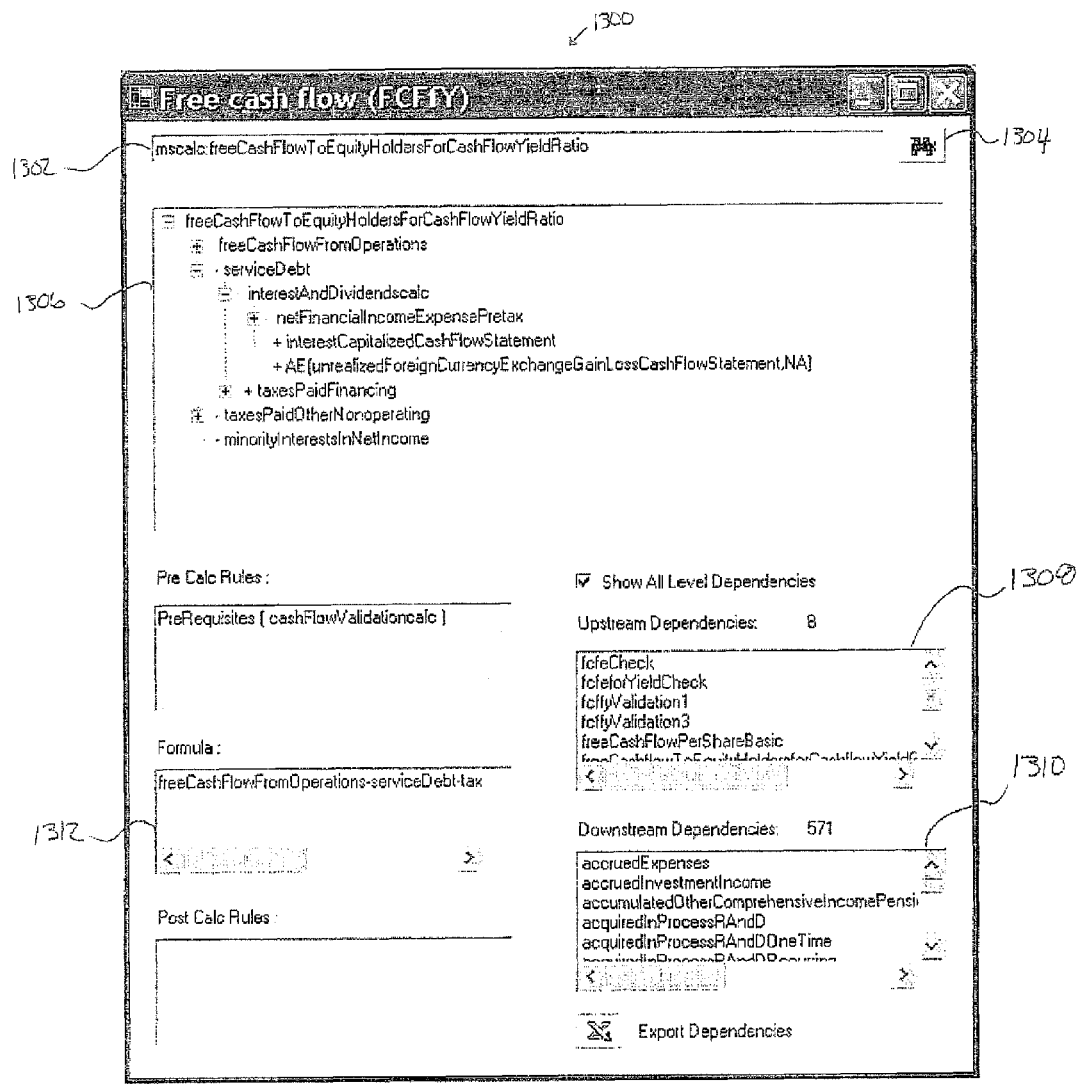

FIGS. 11-13 show additional tools that may be provided to a user of the computer systems 100 and/or 500 to analyze a taxonomy. Although the tools shown in FIGS. 11-13 may be used in conjunction with a comparison of two taxonomies, they may also be useful with just one taxonomy. For example, FIG. 11 shows a user interface 1100 for viewing a snapshot of all the data associated with a particular company in a taxonomy. The company may be selected at field 1102 and the model type may be selected at field 1104. The period to be displayed may be selected at field 1106 including, for example, a start year, an end year, and whether the data will be presented quarterly or semi-annually. If neither the quarterly nor the semi-annually box are checked, data may be presented on a yearly basis. Box 1114 may show information regarding the subject company including, its industry, financial reporting periods, etc. Rows in field 1114 for which no data is available may be excluded by selecting the box in field 1124. A nested list of metrics associated with the subject company may be shown at field 1116. Related metrics (e.g., metrics that are part of one another's definition), may be nested. Additional information about components or sub-components of a metric may be expanded or condensed by selecting boxes 1117, as described above. The name of each metric in the taxonomy may be shown in field 1118. Fields 1120 and 1122 may represent the values of the respective metrics over the selected time periods. For example, because only one year is selected in FIG. 7, only one row, 1122, includes data.

FIG. 12 shows another user interface 1200 for viewing a snapshot of all of the data used to calculate a given metric for a particular company. The metric may be selected at field 1202. In various embodiments, selecting button 1203 may allow the user to search for a desired metric. The company to be displayed may be selected at field 1204. Again, selecting button 1205 may allow the user to search for a desired company. The period to be displayed may be selected from drop-down window 1206. Field 1208 may be used to determine whether the information will be shown over a calendar year or a fiscal year. After all parameters are selected, field 1210 may show a nested view of the components and sub-components of the selected metric. Values for the respective components and sub-components may be shown at field 1212.

FIG. 13 shows a user interface 1300 for examining the dependencies of a metric within a taxonomy according to various embodiments. The desired metric may be selected at box 1302. Button 1304 may launch a search feature allowing the user to search available metrics. A nested definition of the metric, for example, as described above with respect to field 1002, may be shown at field 1306. The formula (e.g., definition) of the metric may be shown at field 1312. The upstream dependencies of the metric may be shown at field 1308. The upstream dependencies may be a list of all of the metrics upon which the selected metric depends (e.g., the direct or indirect inputs to the definition of the metric). Field 1310 shows the downstream dependencies of the metric. The downstream dependencies may be a list of all the metrics that depend on the selected metric (e.g., metrics whose definition requires the selected metric directly or indirectly).

It is to be understood that the figures and descriptions of the present invention have been simplified to illustrate elements that are relevant for a clear understanding of the present invention, while eliminating, for purposes of clarity, other elements, such as, for example specific details of software implementation, etc. Those of ordinary skill in the art will recognize that these and other elements may be desirable. However, because such elements are well known in the art and because they do not facilitate a better understanding of the present invention, a discussion of such elements is not provided herein.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The various modules 206, 208 may be implemented as software code to be executed by a processor(s) of any other computer system using any type of suitable computer instruction type. The software code may be stored as a series of instructions or commands on a computer readable medium. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

We claim:

1. A system for comparing a first taxonomy and a second taxonomy, the system comprising:
    a computer system comprising at least one processor having associated cache memory and data storage comprising instructions that, when executed by the at least one processor, cause the at least one processor to:
        load a portion of a comparison sample to the cache memory, wherein the comparison sample comprises a part of the first taxonomy and a part of the second taxonomy;
        retrieve the portion of the comparison sample from the cache memory;
        apply the part of the first taxonomy to a common data set to generate a first applied data set;
        apply the part of the second taxonomy to the common data set to generate a second applied data set; and
        compare the portion of the comparison sample, at least in part, by comparing the first applied data set and the second applied data set.

2. The system of claim 1, wherein the data storage further comprises instructions that, when executed by the at least one processor, cause the at least one processor to output results of the comparing, and then compare a second portion of the comparison sample.

3. The system of claim 2, wherein the data storage further comprises instructions that, when executed by the at least one processor, cause the at least one processor to load the second portion of the comparison sample to the cache memory of the at least one processor.

4. The system of claim 1, further comprising a first database module to store the first taxonomy.

5. The system of claim 1, further comprising a second database module configured to store the second taxonomy.

6. The system of claim 5, further comprising a high speed communications link between the first database module and the second database module.

7. The system of claim 1, wherein the first taxonomy describes a financial model.

8. The system of claim 7, wherein the part of the first taxonomy and the part of the second taxonomy describe at least one of the group consisting of a similar company, a similar industry and a similar metric set.

9. The system of claim 1, wherein the data storage further comprises instructions that, when executed by the at least one processor, cause the at least one processor to compare a second comparison sample, wherein the second comparison sample comprises a second part of the first taxonomy and a second part of the second taxonomy.

10. The system of claim 1, wherein the common data set comprises data from a first period of time.

11. A method of comparing a first taxonomy and a second taxonomy, the method comprising:
    receiving, with a computer system, a definition of a comparison sample, wherein the comparison sample comprises a part of the first taxonomy and a part of the second taxonomy, wherein the computer system comprises at least one processor having associated cache memory;
    loading, with the computer system, a portion of the comparison sample to the cache memory;
    retrieving the portion of the comparison sample from the cache memory;
    applying the part of the first taxonomy to a common data set to generate a first applied data set;
    applying the part of the second taxonomy to the common data set to generate a second applied data set; and
    comparing, with the computer system, the portion of the comparison sample, wherein the comparing comprises comparing the first applied data set and the second applied data set.

12. The method of claim 11, further comprising:
    outputting results of the comparing of the portion of the comparison sample;
    comparing a second portion of the comparison sample after the outputting.

13. The method of claim 12, further comprising loading the second portion of the comparison sample to the cache memory of the at least one processor.

14. The method of claim 1, wherein the common data set comprises data from a first period of time.

15. The method of claim 11, wherein the part of the first taxonomy and the part of the second taxonomy describe at least one of the group consisting of a similar company, a similar industry and a similar metric set.

* * * * *